(12) United States Patent  (10) Patent No.: US 7,520,638 B2
Chang et al.  (45) Date of Patent: Apr. 21, 2009

(54) IMAGE DISPLAY WITH RADIATOR

(75) Inventors: Jin Wook Chang, Seoul (KR); Kyoung Lee, II, Seoul (KR); Tao Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 238 days.

(21) Appl. No.: 11/589,996

(22) Filed: Oct. 31, 2006

(65) Prior Publication Data

US 2007/0165023 A1   Jul. 19, 2007

(51) Int. Cl.
*F21V 29/00* (2006.01)

(52) U.S. Cl. .................. 362/294; 362/373; 362/611; 349/161

(58) Field of Classification Search .......... 362/611, 362/583, 294, 373; 349/161
See application file for complete search history.

(56) References Cited

U.S. PATENT DOCUMENTS 5,353,133 A * 10/1994 Bernkopf ................... 349/5

| 6,693,682 B2 * | 2/2004 | Fujishiro et al. ........... 349/65 |
| 7,068,332 B2 * | 6/2006 | Liu et al. ................. 349/64 |
| 7,227,618 B1 * | 6/2007 | Bi ......................... 355/67 |
| 7,245,334 B2 * | 7/2007 | Miyashita et al. ......... 349/58 |
| 2003/0223120 A1 | 12/2003 | Li et al. |
| 2006/0256555 A1 * | 11/2006 | Lengyel et al. .......... 362/231 |

FOREIGN PATENT DOCUMENTS

| JP | 10 171378 | 6/1998 |
| JP | 2004040722 | 2/2004 |
| WO | WO 2005/124725 A2 | 12/2005 |

* cited by examiner

*Primary Examiner*—Stephen F Husar
*Assistant Examiner*—Peggy A. Neils
(74) *Attorney, Agent, or Firm*—McKenna Long & Aldridge LLP

(57) ABSTRACT

An image display with a radiator is disclosed. The image display includes a light source for generating light, a display panel for receiving the light, to display an image using the received light, and a radiator arranged between the light source and the display panel, the radiator including at least one air hole for discharging internal heat of the image display.

13 Claims, 6 Drawing Sheets

IMAGE DISPLAY WITH RADIATOR

This application claims the benefit of Korean Patent Application No. 10-2006-0004466, filed on Jan. 16, 2006, which is hereby incorporated by reference as if fully set forth herein.

BACKGROUND OF THE INVENTION

1. Field of the Invention

The present invention relates to an image display, and more particularly, to an image display provided with a radiator for discharging internal heat of the image display.

2. Discussion of the Related Art

Generally, a three-dimensional 3D image is realized in accordance with the principle of stereoscopic visual sense through two eyes of a viewer. That is, a three-dimensional image is realized due to the parallax of two eyes caused by the fact that the two eyes are spaced apart from each other by about 65 mm.

When the viewer views an object, the left and right eyes of the viewer view different two-dimensional images of the object, respectively. The different two-dimensional images are transmitted to the brain of the viewer via respective retinas. The brain combines the two-dimensional images, thereby recognizing the images in the form of a three-dimensional image having a depth sensation and a stereoscopic sensation. Therefore, when an image is separated into two images corresponding to those for the left and right eyes, it is possible to enable the viewer to view the image in the form of a three-dimensional image.

An example of a method for realizing a three-dimensional image is a glassless three-dimensional image display method. For the glassless three-dimensional image display method, a parallax system is mainly used which includes vertical-grating-shaped apertures arranged in front of an image, and adapted to separate the image into two images respectively corresponding to those for the left and right eyes.

A lenticular system using a lenticular plate, on which semi-cylindrical lenses are arranged, and an integral photography system using a lens plate, on which fly-eye lenses are arranged, are also used.

FIG. 1 is a schematic view illustrating a configuration of a general three-dimensional image display. FIG. 2 is a side view illustrating a three-dimensional image display provided with a spacer.

The three-dimensional image display shown in FIG. 1 includes a display panel 10 and a light source 30. The three-dimensional image display also includes a three-dimensional image filter 20 including a plurality of diffraction gratings generating a difference in the transmittance of visible rays.

In the three-dimensional image display of FIG. 1 having the above-mentioned configuration, light generated from the light source 30 passes through the diffraction gratings of the three-dimensional image filter 20, in order to enable the viewer to view a three-dimensional image produced on the display panel 10.

A plurality of parallel slits are defined by the diffraction gratings. As the light passes through the parallel slits, it is separated into an image for the right eye and an image for the left image.

Accordingly, the viewer can visually view the three-dimensional image through the separated images.

However, the three-dimensional image display having the above-mentioned configuration has a problem of degradation in luminance and brightness because the three-dimensional image filter 20 shields and absorbs a part of the light generated from the light source 30, so that an insufficient amount of light reaches the viewer.

In order to solve such a luminance and brightness degradation problem, conventional three-dimensional image displays use a hot cathode fluorescence lighting (HCFL) type light source, in place of a cold cathode fluorescence lighting (CCFL) type light source, for an increase in light amount.

However, three-dimensional image displays using the HCFL type light source have drawbacks of an increase in power consumption and an increase in the amount of generated heat due to an increase in the intensity of the light, even though there are advantages of an increase in luminance and an increase in brightness.

In particular, such a three-dimensional image display may operate erroneously due to heat generated therein unless the heat is appropriately discharged to the external of the display.

Generally, the display panel 10 and three-dimensional image filter 20 of the above-mentioned three-dimensional image display should be maintained in a flat state. If the display panel 10 or three-dimensional image filter 20 is bent, it is impossible to realize a three-dimensional image.

Furthermore, it is possible to realize a three-dimensional image under the condition in which the display panel 10 and the three-dimensional image filter 20 are spaced apart from each other by an appropriate distance g when the viewing distance is d, as shown in FIG. 1.

For this reason, as shown in FIG. 2, it is necessary to use spacers 40 for supporting the display panel 10 and three-dimensional image filter 20 such that they are maintained in a flat state while being spaced apart from each other by an appropriate distance.

However, where such spacers are used in the three-dimensional image display, there is a problem in that, when the display operates for a prolonged period of time, system errors may be generated due to the internal heat of the display because the spacers prevent flow of heat.

SUMMARY OF THE INVENTION

Accordingly, the present invention is directed to an image display with a radiator that substantially obviates one or more problems due to limitations and disadvantages of the related art.

An object of the present invention is to provide an image display which includes a radiator for easily discharging internal heat of the display, thereby preventing an erroneous operation of the display.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image display comprises: a light source for generating light; a display panel for receiving the light, to display an image using the received light; and a radiator arranged between the light source and the display panel, the radiator including at least one air hole for discharging internal heat of the image display.

The radiator may comprise a spacer adapted to space the light source and the display panel apart from each other by a predetermined distance, the spacer having the at least one air hole, to allow air to have access to the spacer, and support members respectively adapted to support major sides of the spacer.

Each support member may comprise a pair of parallel longitudinal bars, and a plurality of parallel lateral bars fixed between the longitudinal bars, and arranged to be uniformly spaced apart from one another by a predetermined distance along longitudinal edges of an associated one of the major sides of the spacer. Accordingly, the support member supports the edges of the associated major side of the spacer.

Each support member may a predetermined inclination with respect to a horizontal axis of the spacer, and may be made of a transparent material.

The at least one air hole may comprise air holes each formed through at least one of an associated one of opposite lateral sides of the radiator and an associated one of opposite longitudinal sides of the radiator such that the air holes formed through the opposite lateral or longitudinal sides of the radiator face each other while being aligned with each other.

In another aspect of the present invention, an image display comprises: a light source for generating light; a display panel for receiving the light, to display an image using the received light; a three-dimensional image filter arranged between the light source and the display panel, to diffract the light, for realization of a three-dimensional image; and at least one radiator respectively arranged on at least one of major surfaces of the three-dimensional image filter, the radiator including at least one air hole formed through each of opposite lateral sides of the radiator.

In another aspect of the present invention, an image display comprises: a light source for generating light; a display panel for receiving the light, to display an image using the received light; a three-dimensional image filter arranged between the light source and the display panel, to diffract the light, for realization of a three-dimensional image; and at least one radiator respectively arranged on at least one of major surfaces of the three-dimensional image filter, the radiator including air holes each formed through at least one of an associated one of opposite lateral sides of the radiator and an associated one of opposite longitudinal sides of the radiator.

In still another aspect of the present invention, an image display comprises: a light source for generating light; a display panel for receiving the light, to display an image using the received light; a lenticular plate arranged between the light source and the display panel; a plurality of lenses formed on the lenticular plate, and arranged to have a predetermined inclination with respect to a horizontal axis of the lenticular plate; at least one spacer respectively arranged in at least one of a region between the light source and the lenticular plate and a region between the lenticular plate and the display panel, to maintain a predetermined spacing in the at least one region, the spacer having at least one air hole for allowing air to have access to the spacer; and support members respectively adapted to support major sides of the spacer, and arranged to have an inclination identical to the inclination of the lenses.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention associated with an image display, examples of which are illustrated in the accompanying drawings. Wherever possible, the same reference numbers will be used throughout the drawings to refer to the same or like parts.

The concept of the present invention is to easily discharge internal heat of an image display, using a radiator formed with an air hole.

Figure 1:
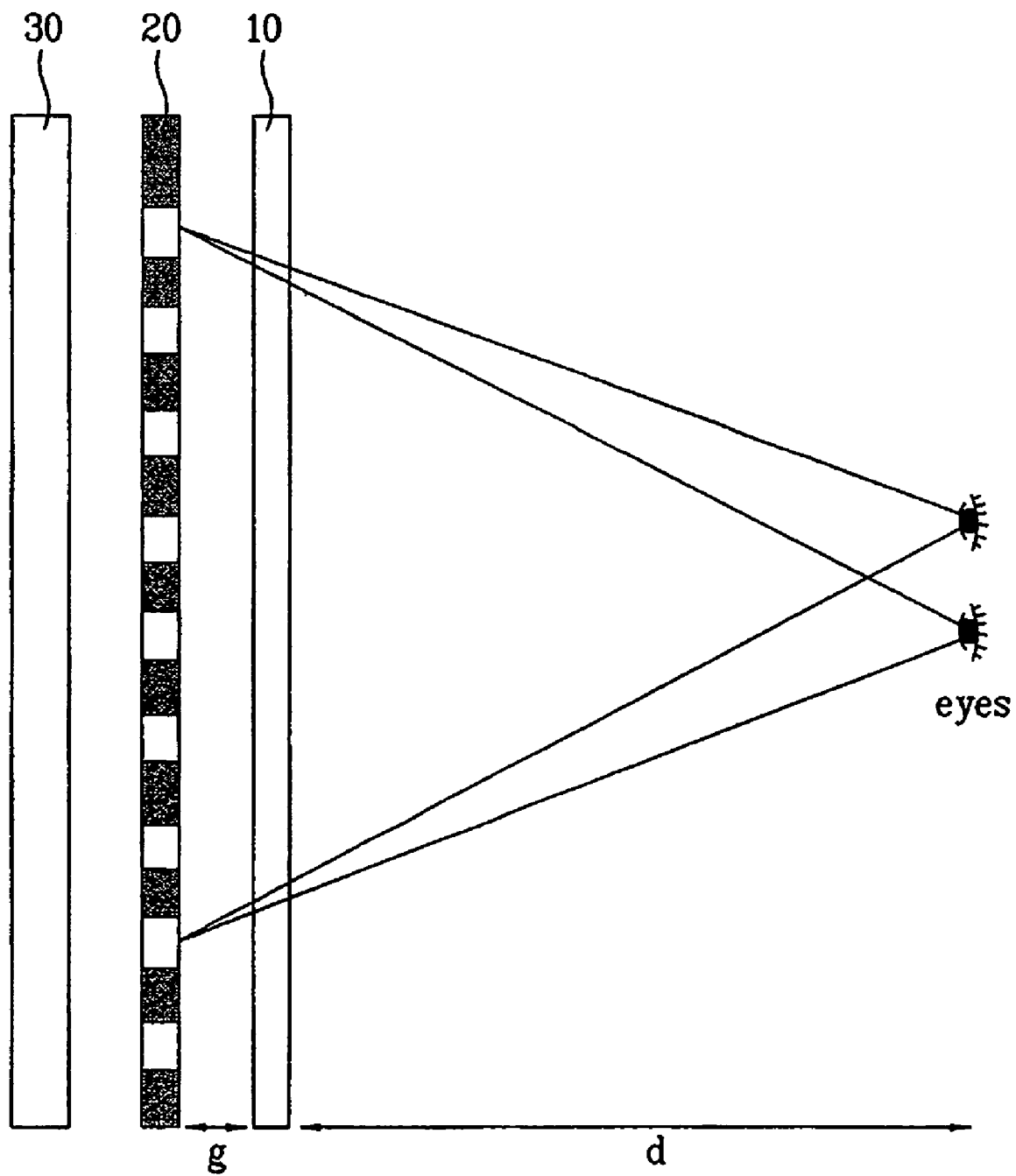
FIG. 1 is a schematic view illustrating a configuration of a general three-dimensional image display.
Figure 2:
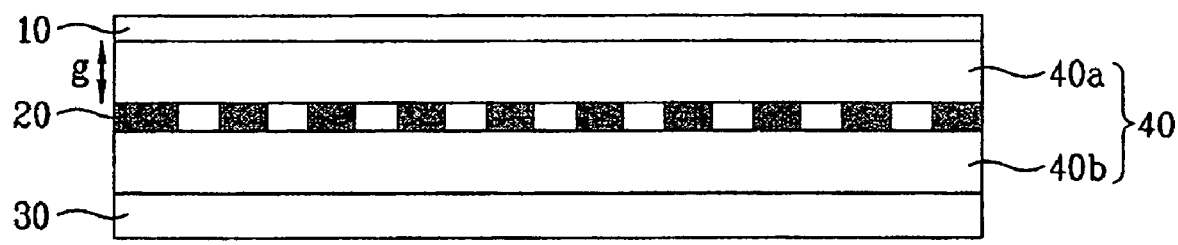
FIG. 2 is a side view illustrating a three-dimensional image display provided with a spacer.
Figure 3:
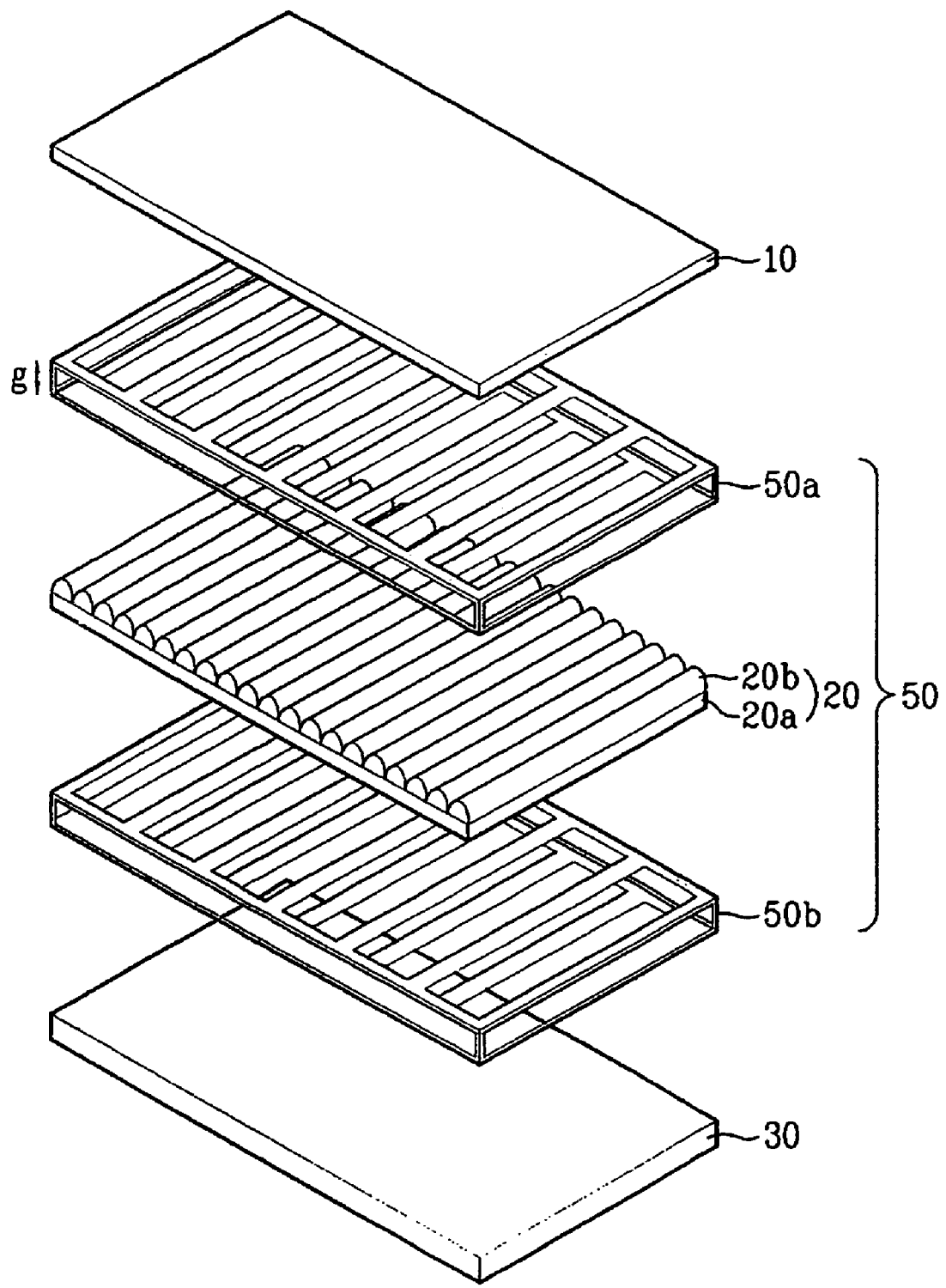
FIG. 3 is an exploded perspective view illustrating an image display according to the present invention.

FIG. 3 is an exploded perspective view illustrating an image display according to the present invention. As shown in FIG. 3, the image display of the present invention may mainly include a display panel 10, a light source 30, and a radiator 50.

The display panel 10 may be a liquid crystal display (LCD) panel which displays an image using light received from a light source.

The radiator 50 is arranged between the light source 30 and the display panel 10. The radiator 50 maintains the light source 30 and the display panel 10 to be spaced apart from each other by a predetermined distance. The radiator has at least one air hole, in order to discharge internal heat of the image display.

Where the image display of the present invention is a three-dimensional image display, it may further include a three-dimensional image filter 20.

The three-dimensional image filter 20 is arranged between the light source 30 and the display panel 10. The three-dimensional image filter 20 functions to diffract light incident thereto, in order to produce a three-dimensional image on the display panel 10.

In the case of the three-dimensional image display including the three-dimensional image filter 20, the radiator 50 may be arranged on at least one of the major surfaces, namely, the upper and lower surfaces, of the three-dimensional image filter 20. The upper and lower surfaces of the three-dimensional image filter 20 correspond to the front and rear surfaces in an upright state of the image display.

As shown in FIG. 3, the radiator 50 may include a first radiator 50a arranged between the display panel 10 and the three-dimensional image filter 20, and a second radiator 50b arranged between the light source 30 and the three-dimensional image filter 20. Alternatively, the radiator 50 may include only one of the first and second radiators 50a and 50b.

Figure 4A:
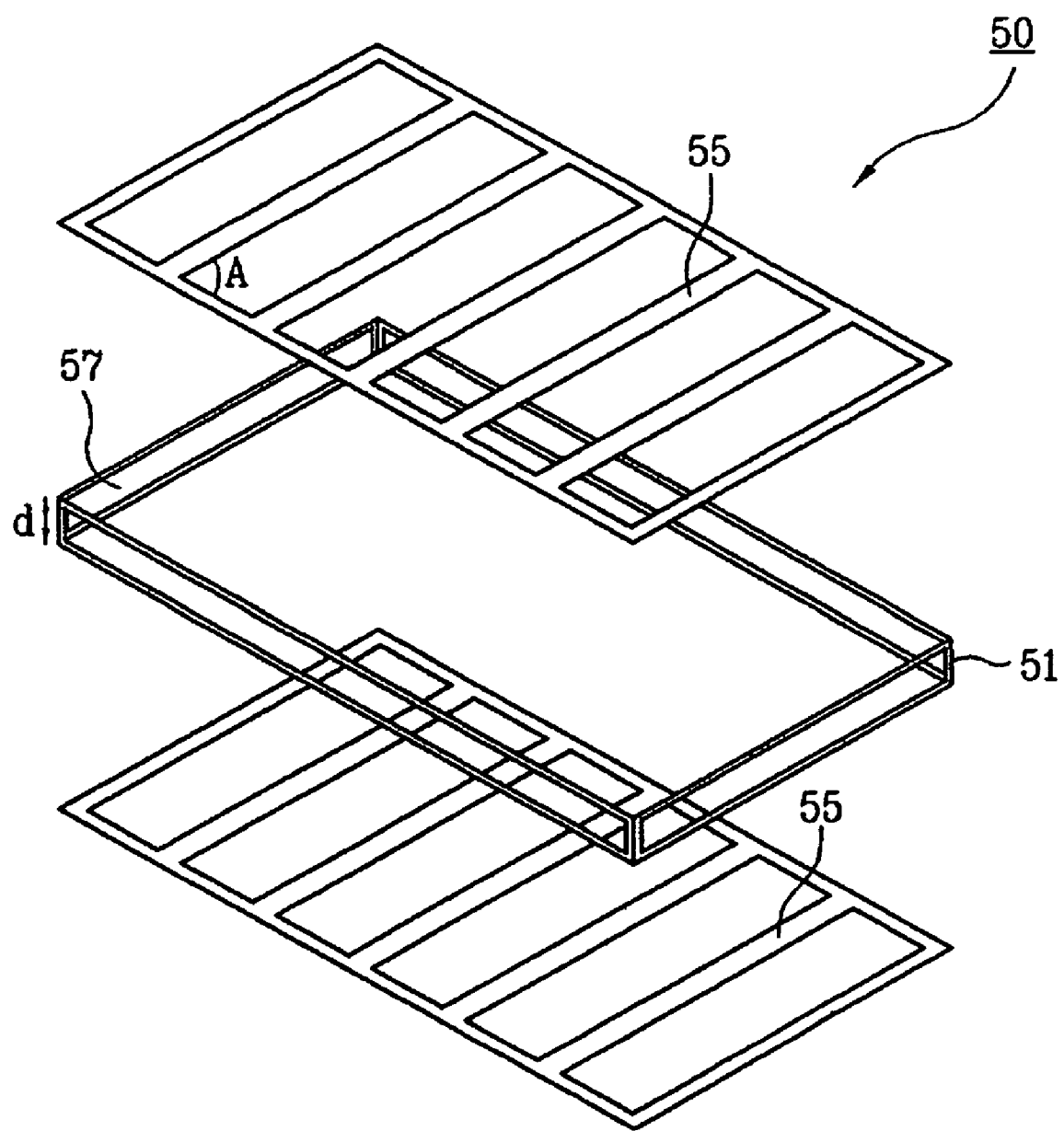
FIG. 4A is an exploded perspective view illustrating a radiator structure according to a first embodiment of the present invention.
Figure 4B:
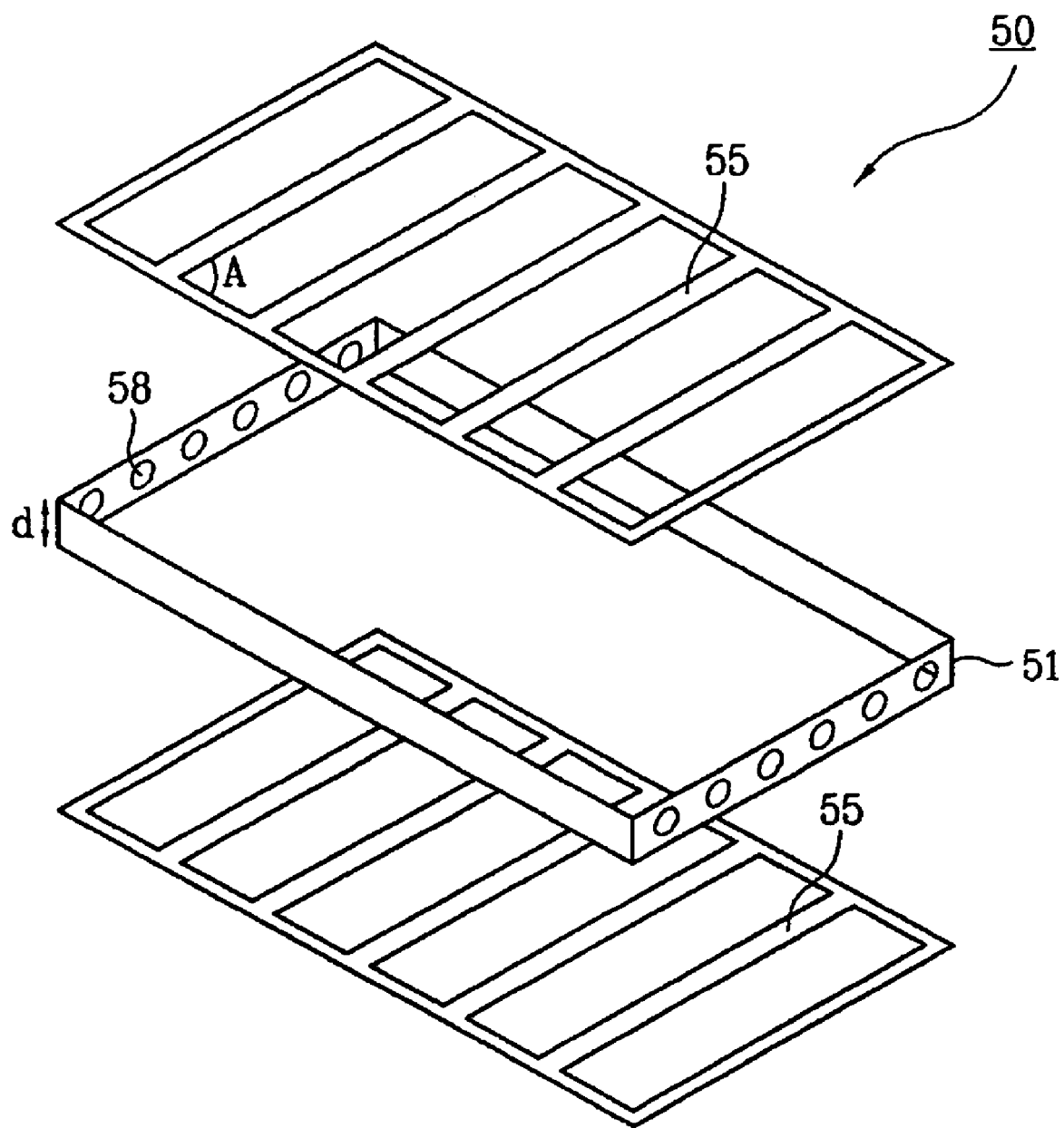
FIG. 4B is an exploded perspective view illustrating a radiator structure according to a second embodiment of the present invention.

FIG. 4A is an exploded perspective view illustrating a radiator structure according to a first embodiment of the present invention. FIG. 4B is an exploded perspective view illustrating a radiator structure according to a second embodiment of the present invention.

As shown in FIG. 4A or 4B, the radiator 50 may mainly include a spacer 51 and support members 55.

The spacer 51 is adapted to space the light source 30 and display panel 10 apart from each other by a predetermined distance. The spacer 51 also has at least one air hole allowing air to access the spacer 51.

The spacer 51 may have one air hole 57 formed through each of the opposite lateral sides of the spacer 51, as shown in FIG. 4A. Alternatively, the spacer 51 may have a plurality of air holes 58 formed through each of the opposite lateral sides of the spacer 51, as shown in FIG. 4B.

In addition to the air holes formed through the opposite lateral sides, the spacer 51 may also have air holes formed through the opposite longitudinal sides of the spacer 51, as shown in FIG. 4A.

It is preferred that each of the air holes 57 or 58 be formed through at least one of an associated one of the opposite lateral sides and an associated one of the opposite longitudinal sides such that they face each other while being aligned with each other.

One of the facing air holes 57 or 58 may function as an air inlet, whereas the other air hole 57 or 58 may function as an air outlet.

The spacer 51 has a hollow structure, in order to achieve easy heat discharge.

The spacer 51 may be made of glass or a plastic material.

The thickness d of the spacer 51 may be determined, taking into consideration the diffraction lens pitch of the three-dimensional image filter 20, the pixel pitch of the display panel 10, and the distance between the display panel 10 and the viewer.

Meanwhile, the support members 55 function to support the major sides, namely, the top and bottom sides, of the spacer 51, respectively. Here, the top and bottom sides of the spacer 51 correspond to the front and rear sides in an upright state of the image display. In the following description, the major sides of the spacer 51 will be referred to as "top and bottom sides", as shown in the drawings.

Each support member 55 may include a pair of parallel longitudinal bars, and a plurality of parallel lateral bars fixed between the longitudinal bars. In accordance with this structure, each support member 55 supports the edges of an associated one of the top and bottom sides of the spacer 51. The lateral bars of each support member 55 are arranged to be uniformly spaced apart from one another by a predetermined distance along the longitudinal edges of the associated top or bottom side of the spacer 51.

The support members are preferably made of a transparent material so that they have no influence on the luminance of a three-dimensional image to be viewed.

The lateral bars of each support member 55 may be inclined by a predetermined angle with respect to the horizontal axis of the spacer 51 extending in a longitudinal direction of the spacer 51.

It is preferred that the inclination A of each support member 55 be identical to the lens inclination of the three-dimensional image filter 20.

When each support member 55 has such an inclination, it has no influence on the diffraction of light passing through the three-dimensional image filter 20, so that a superior three-dimensional image can be realized.

As shown in FIG. 3, the three-dimensional image filter 20 of the present invention includes a lenticular plate 20a, and a plurality of lenses 20b formed on the lenticular plate 20a.

The lenses 20b have a semi-cylindrical structure, and are arranged to have a predetermined inclination with respect to the horizontal axis of the lenticular plate 20a.

Thus, in accordance with the present invention, it is preferred that the radiator 50 be configured such that the support members 55 support the top and bottom sides of the spacer 51 while having the same inclination as that of the lenses 20b.

The radiator 50 may have an integral structure in which the support members 55 are integral with the spacer 51, or may have a separable structure in which the support members 55 are separable from the spacer 51.

Figure 5:
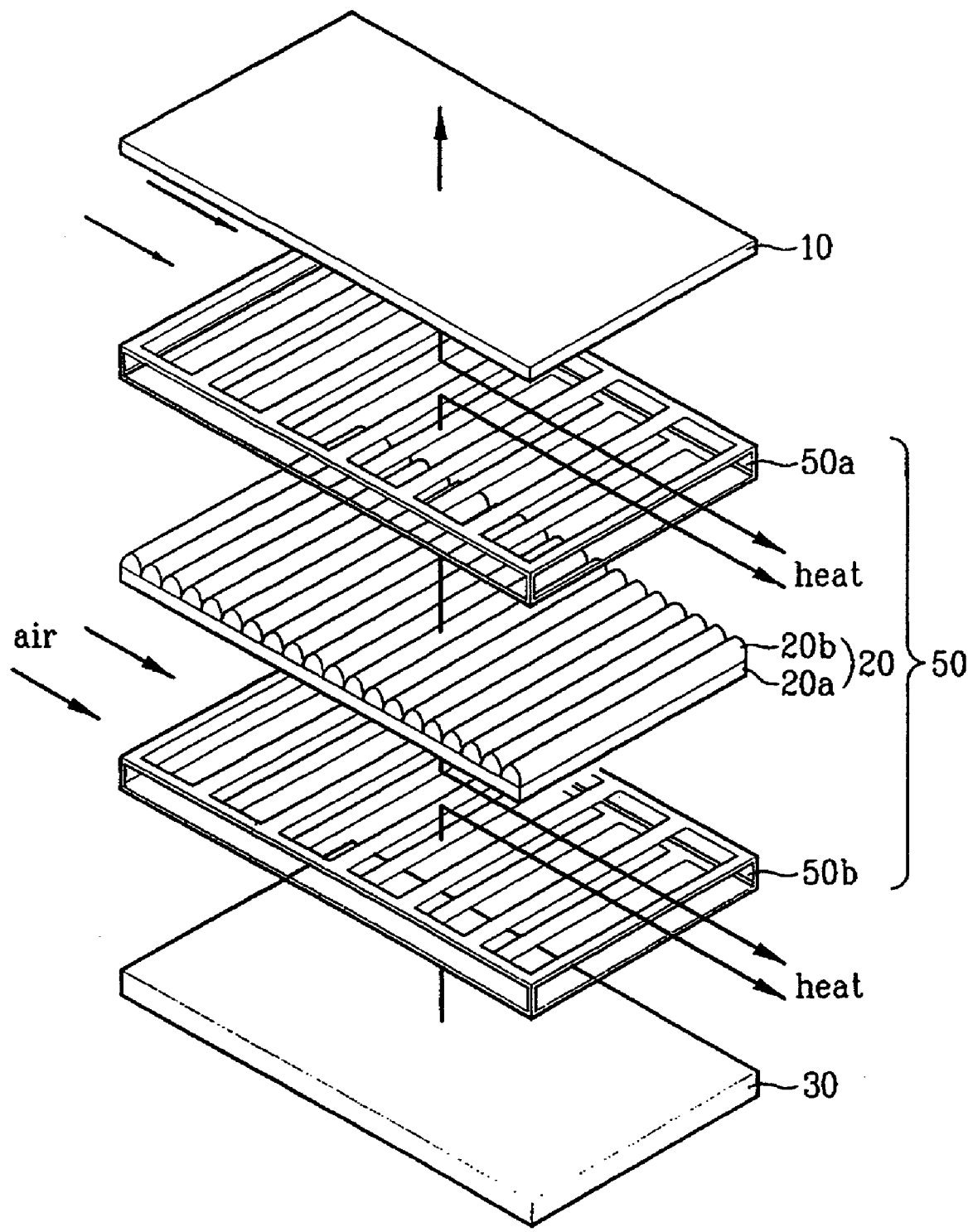
FIG. 5 is a schematic exploded perspective view illustrating heat discharge paths in the three-dimensional image display according to the present invention.

FIG. 5 is a schematic exploded perspective view illustrating heat discharge paths in the three-dimensional image display according to the present invention.

As shown in FIG. 5, air is introduced into the interior of the radiator 50 through the air holes at one lateral side of the radiator 50 in accordance with operation of a cooler such as a cooling fan installed at one side of the image display of the present invention.

The air introduced through the air holes at one lateral side of the radiator 50 establishes a heat discharge path in the interior of the radiator 50 while passing through the interior of the radiator 50, thereby externally discharging internal heat of the image display through the air holes at the other lateral side of the radiator 50.

Thus, in the image display according to the present invention, it is possible to easily discharge internal heat of the image display through the radiator having the air holes. Accordingly, it is possible to prevent the image display from operating erroneously due to the internal heat thereof.

Also, since the discharge of internal heat is easily achieved, the image display of the present invention has an advantage in that it is possible to increase the intensity of light, and thus, to realize a luminance-increased image.

3 Where the present invention is applied to a three-dimensional image display, it is possible to realize a three-dimensional image having a high luminance and a superior picture quality.

In addition, the image display of the present invention has an advantage in that the total weight of the image display is reduced because the radiator has a hollow structure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An image display comprising:
   a light source for generating light;
   a display panel for receiving the light, to display an image using the received light; and
   a radiator arranged between the light source and the display panel, the radiator including at least one air hole for discharging internal heat of the image display, wherein the radiator comprises:

a spacer adapted to space the light source and the display panel apart from each other, the spacer having the at least one air hole, to allow air to have access to the spacer; and support members respectively adapted to support major sides of the spacer, wherein each support member comprises:

a first and a second horizontal bars arranged parallel to each other;

a first vertical bar coupled to the first end portion of the first and the second horizontal bars;

a second vertical bar coupled to a second end portion of the first and second horizontal bars;

a plurality of third vertical bars arranged to be uniformly spaced apart from one another at a region between the first and second vertical bars, wherein both ends of the third vertical bar, are coupled to a lateral face of the first and the second horizontal bars.

2. The image display according to claim 1, wherein the spacer has a hollow structure.

3. The image display according to claim 1, wherein the spacer is made of glass or a plastic material.

4. The image display according to claim 1, wherein the plurality of third vertical bars has a predetermined inclination with respect to the first and second horizontal bars.

5. The image display according to claim 1, wherein each support member is made of a transparent material.

6. The image display according to claim 1, wherein the at least one air hole comprises air holes each formed through at least one of an associated one of opposite lateral sides of the radiator and an associated one of opposite longitudinal sides of the radiator such that the air holes formed through the opposite lateral or longitudinal sides of the radiator face each other while being aligned with each other.

7. The image display according to claim 6, wherein one of the facing air holes functions as an air inlet, and the other one of the facing air holes functions as an air outlet.

8. An image display comprising:

a light source for generating light;

a display panel for receiving the light, to display an image using the received light;

a three-dimensional image filter arranged between the light source and the display panel, to diffract the light, for realization of a three-dimensional image; and at least one radiator respectively arranged on at least one of major surfaces of the three-dimensional image filter, wherein the radiator comprises:

a spacer adapted to space the light source and the display panel apart from each other, the spacer having the at least one air hole, to allow air to have access to the spacer; and support members respectively adapted to support major sides of the spacer, wherein each support member comprises:

a first and a second horizontal bars arranged parallel to each other;

a first vertical bar coupled to a first end portion of the first and the second horizontal bars;

a second vertical bar coupled to a second end portion of the first and the second horizontal bars;

a plurality of third vertical arranged to be uniformly spaced apart from one another at a region between the first and second vertical bars, wherein both ends of the third vertical bar are coupled to a lateral face of the first and the second horizontal bars.

9. The image display according to claim 8, wherein the air holes respectively formed through the opposite lateral sides of the radiator face each other while being aligned with each other.

10. The image display according to claim 8, wherein one of the air holes respectively formed through the opposite lateral sides of the radiator functions as an air inlet, and the other one of the air holes functions as an air outlet.

11. An image display comprising:

a light source for generating light;

a display panel for receiving the light, to display an image using the received light;

a lenticular plate arranged between the light source and the display panel;

a plurality of lenses formed on the lenticular plate, and arranged to have a predetermined inclination with respect to a horizontal axis of the lenticular plate;

at least one spacer respectively arranged in at least one of a region between the light source and the lenticular plate and a region between the lenticular plate and the display panel, to maintain a predetermined spacing in the at least one region, the spacer having at least one air hole for allowing air to have access to the spacer; and support members respectively adapted to support major sides of the spacer, wherein each support member comprises:

a first and second horizontal bars arranged parallel to each other;

a first vertical bar coupled to a first end portion of the first and the second horizontal a second vertical bar coupled to a second end portion of the first and the second a plurality of third vertical bars arranged to the uniformly spaced apart from one another at a region between the first and the second vertical bars, wherein both ends of the third vertical bar are coupled to a lateral face of the first and the second horizontal bars, and arranged to have an inclination identical to the inclination of the lenses.

12. The image display according to claim 11, wherein the at least one air hole comprises air holes each formed through at least one of an associated one of opposite lateral sides of the radiator and an associated one of opposite longitudinal sides of the radiator such that the air holes formed through the opposite lateral or longitudinal sides of the radiator face each other while being aligned with each other.

13. The image display according to claim 11, wherein each support member is made of a transparent material.

* * * * *